United States Patent
Guim et al.

[11] Patent Number: 6,113,175
[45] Date of Patent: Sep. 5, 2000

[54] AUTOMOBILE SEAT

[76] Inventors: Raul Guim; Elena Guim, both of 834 Venetia, Coral Gables, Fla. 33134

[21] Appl. No.: 09/033,903

[22] Filed: Mar. 2, 1998

[51] Int. Cl.$^7$ ................................ B60N 2/06; B60N 2/14
[52] U.S. Cl. .................................... 296/65.18; 296/65.04; 296/65.12; 296/65.13
[58] Field of Search ............................ 296/65.01, 65.03, 296/65.04, 65.11, 65.12, 65.13, 65.15, 65.18

[56] References Cited

U.S. PATENT DOCUMENTS

| | | | |
|---|---|---|---|
| 2,753,947 | 7/1956 | Mach | 296/65.11 X |
| 4,354,791 | 10/1982 | Antonellis | 296/65.04 X |
| 4,527,829 | 7/1985 | Fanslau et al. | 297/17 |
| 4,815,785 | 3/1989 | Goodall et al. | 296/65.13 |
| 5,547,256 | 8/1996 | D'Antuono et al. | 297/337 |
| 5,630,638 | 5/1997 | Hirasawa et al. | 296/65.12 X |
| 5,636,884 | 6/1997 | Ladetto et al. | 296/65.13 |
| 5,746,465 | 5/1998 | Jones et al. | 296/65.03 |
| 5,769,480 | 6/1998 | Gebhardt | 296/65.12 |

*Primary Examiner*—D. Glenn Dayoan
*Assistant Examiner*—Jason Morrow
*Attorney, Agent, or Firm*—McHale & Slavin

[57] ABSTRACT

An automobile seat having provisions for assisting an individual during entering and exiting of a automobile. One embodiment discloses the displacement of a portion of a bench seat to a position external to the confines of the automobile. The extended seat permits an individual to be situated on the seat at a position outside the automobile wherein retraction of the seat into the automobile, by use of a mechanical slide that can be electrically driven, thereby assists an individual in entering of the automobile. Conversely, extension of the seat during egress conveniently positions an individual outside the automobile.

10 Claims, 3 Drawing Sheets

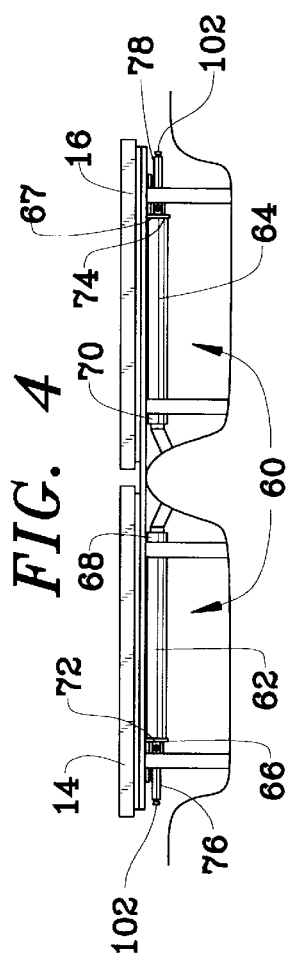
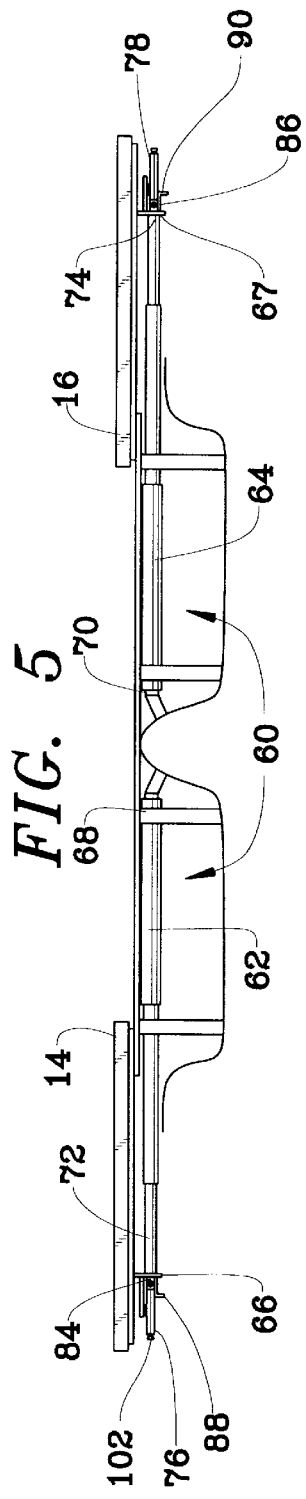
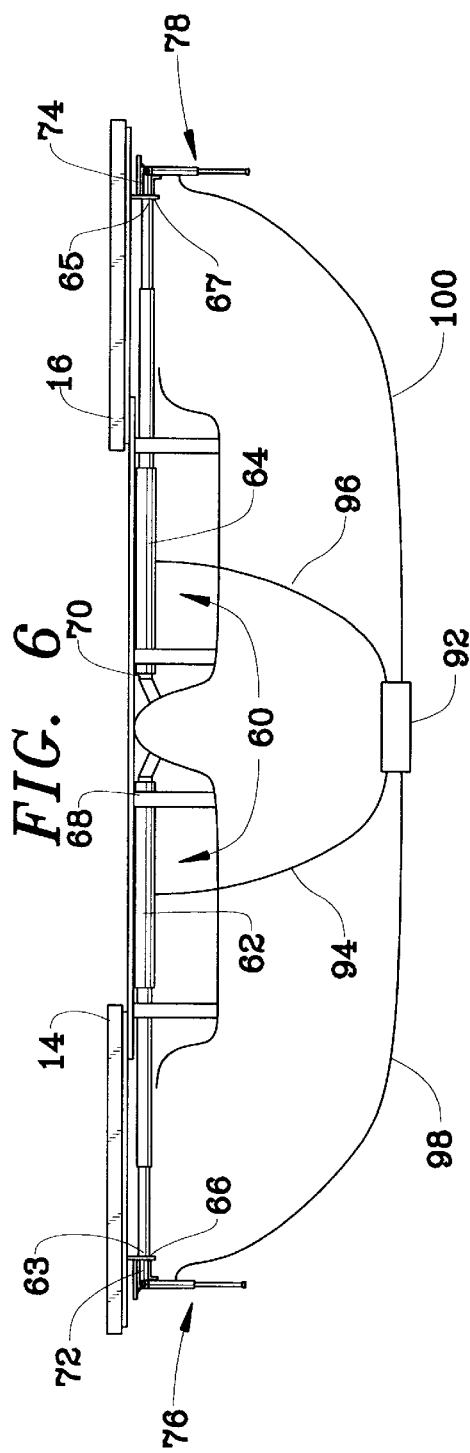

AUTOMOBILE SEAT

FIELD OF THE INVENTION

This invention relates to the automotive field and, in particular, to an automobile seat having either a movable cover or an extendable frame for use in assisting passengers during entering and exiting of the automobile.

BACKGROUND OF THE INVENTION

The automobile has become the primary means for transportation and is used throughout the world. The automobile effectively replaced the horse-drawn carriage at the turn of the century providing a self-propelled vehicle having the ability to carry multiple passengers in an enclosed environment. However, passengers are required to travel in a seated position and must enter and exit the automobile in a bent-over, partially seated configuration.

The interior of an automobile allows various types of seating arrangements to exist. The seating arrangement may be classified as luxurious, having soft treated leather, to a more barren type arrangement which provides low cost basic transportation. A common configuration between a luxury vehicle and an economy vehicle is that each vehicle requires an occupant to be placed in a seated position which is generally accepted as the most comfortable traveling position. To accommodate a side-by-side seating position, vehicle designs utilize a wide profile. The height of the automobile inhibits an occupant from standing due to the generally low profile used to aerodynamically increase fuel economy and reduce wind noise.

Typically the more aerodynamic an automobile is designed, the more difficult it is for passengers to enter or exit the automobile. Even with large luxury automobiles, the tendency is to present a small profile capable of increasing fuel mileage by reducing air resistance. This presents a special problem for passengers who have limited mobility. For example, should a person enter the back seat of a low profile automobile, even an agile person may have difficultly in sliding across the seat to a center position. An individual who enters the automobile must slide across a seat for proper positioning. This problem becomes more pronounced if the individual is in formal wear or needs to slide all the way to the other side of the automobile due to other entering passengers. This difficultly is yet further increased if the person is elderly or has a physical handicap. Similarly, exiting the vehicle can be just as difficult wherein the person is required to retrace their movements from within the cramped confines of the automobile. The exiting party must again slide over the seat and then stand from an inordinately low position. Without proper leg strength and balance, this task is difficult and even impossible for some individuals.

Thus, what is needed in the art is a device capable of assisting a passenger during the entry and exit of a automobile.

SUMMARY OF THE INVENTION

The instant invention is an improved automobile seat arrangement having provisions for assisting an individual during entering and exiting of the automobile.

A seat movement device is incorporated on one or both ends of the automobile seat so as to extend the seat out of the opening of the automobile. This allows an individual to be situated on the seat before return of the seat into the confines of the automobile. An individual placed or positioned properly on the seat may cause the seat to be retracted into the automobile, carrying the individual for proper placement therein. This can be either by a mechanical slide or electrical drive mechanism.

Thus, an objective of the instant invention is to disclose a means to ease ingress and egress from an automobile by use of a movable seat.

Another objective of the instant invention is to disclose a moveable seat that extends outwardly from an automobile, thereby allowing ease of entrance and exit from the automobile, wherein the separated seat is extendable outside the automobile, and upon retraction of the seat, properly positions an individual within the confines of the automobile.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

FIG. 4 is a front view of the bracing means of the current invention in a completely-retracted position;

FIG. 5 is a front view of the bracing means of the current invention in a partially-extended position;

FIG. 6 is a front view of the bracing means of the current invention in a fully-extended, bracing position;

DETAILED DESCRIPTION OF THE PREFERRED EMBODIMENT

Although the invention will be described in terms of a specific embodiments, it will be readily apparent to those skilled in this art that various modifications, rearrangements and substitutions can be made without departing from the spirit of the invention. The scope of the invention is defined by the claims appended hereto.

Figure 1:
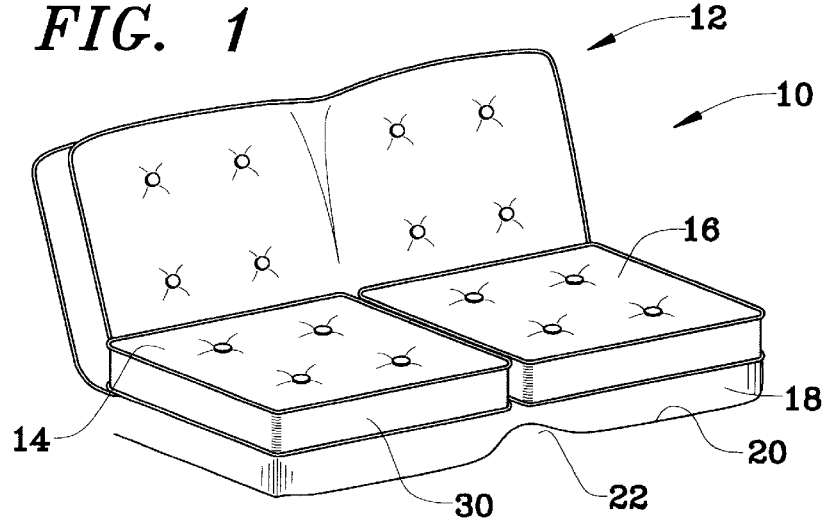
FIG. 1 is a perspective view of a split bench seat of a preferred embodiment of the present invention.
Figure 2:
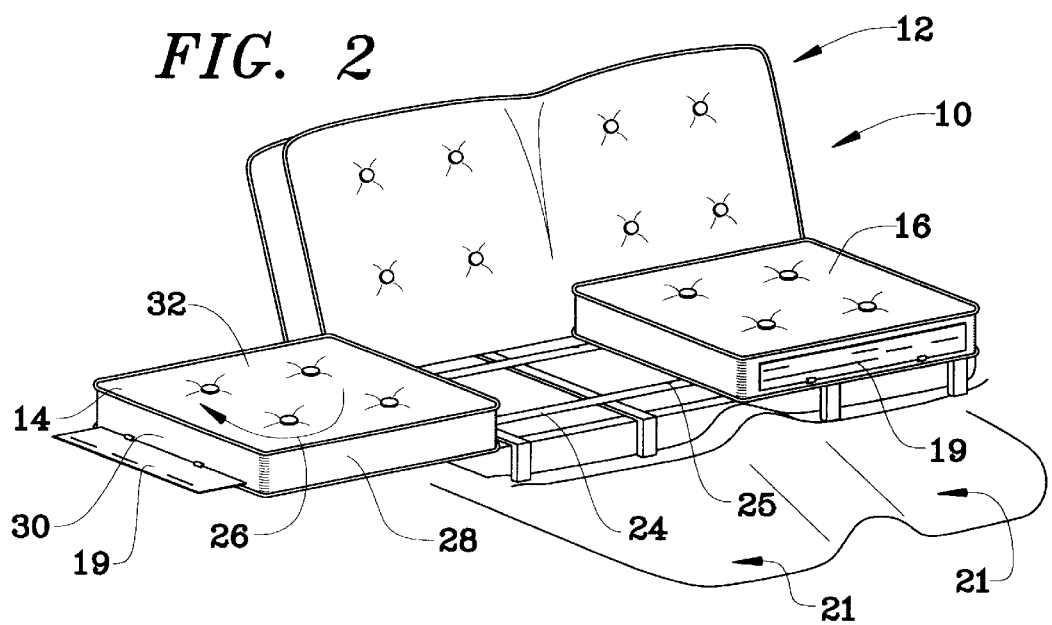
FIG. 2 is a perspective view of FIG. 1 with one seat cushion extended outward from a bench platform.

Referring to FIGS. 1 and 2, set forth is a first embodiment of the instant invention. The automobile seat 10 resembles a bench seat having a back support 12 and a first 14 and second 16 seat sections. The seat 10 is elevated by a plurality of legs 18 commonly used for positioning a bench seat above the floor 20 of the automobile. Such elevation is necessary to properly position an individual in a seated position as well as to clear the differential hump 22 in rear wheel drive automobiles.

FIG. 2 illustrates the operation of the bench seat wherein seat section 14 is shown in an extended position along rail support 24, with seat section 14 placed in an outboard position. In this position the seat section 14 is outside the automobile for ease of access. The seat section 14 includes an ability to rotate once clear of the back support 12 as depicted by arrow 26 allowing an individual to sit on the seat and move their legs from a position parallel to the slide rails 24 to a perpendicular position wherein seat section sidewall 28 is rotated into a position that seat section sidewall 30 previously occupied before rotation. FIG. 2 also shows a foldable foot slide 19 associated with each seat section 14,16. The foot slides 19 are hingedly attached to corresponding side walls 30 of each seat section 14,16. When folded into a use position, each foot slide 19 extends over a foot well 21 associated with the corresponding seat section 12,14. With this arrangement, a seated individual's feet, not shown, placed upon a foot slide 19 will move in tandem with the corresponding seat section 14,16, thereby further easing entry and exit from the vehicle.

Second seat section 16 is shown in its storage position. Detentes 25, shown in FIG. 3, inhibit movement when the seat is in a working position. Alternatively, an electric drive means can be used to move the seat, thereby causing rotation, and locking the seat in position. In operation an individual may open the door and move side section 16 to an outboard manner assimilating the position of seat section 14 for ease of entering or exiting the automobile. Thus, side section 14 may be slid outside the opening of the automobile and rotated wherein a person may sit on the upper surface 32 of the seat section 14 and rotate the section placing side wall 28 perpendicular to side rails 24 wherein the seat section may then be slid inward into a side-by-side position with seat section 16.

Figure 3:
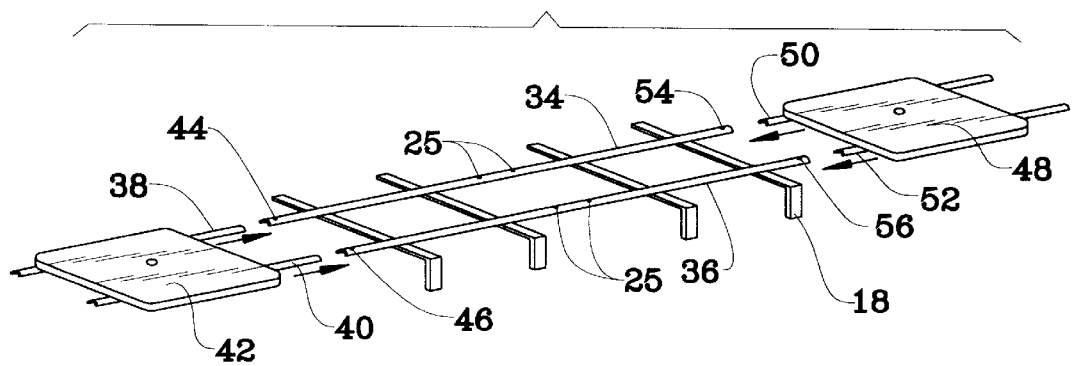
FIG. 3 is an exploded view of the support rails and rotating platforms for the extension bench of FIG. 2.

FIG. 3 illustrates base support 24 construction which consists of a rear rail 34 and a front rail 36 situated upon legs 18, both of which are supported from beneath and elevated above the automobile floor by a plurality of legs 18. Rails 34 and 36 are spaced apart and operatively associated with slide rails 38 providing an extension for support of rotating platform 42. Slide rails 38 and 40 allow for the extension of the seat section with catches 44 and 46 preventing disengagement from support rails 34 and 36. Similarly, a second platform 48 is positioned on slide rails 50 and 52 for extending along the length of support rails 34 and 36. Catches 54 and 56 prevent support platform 48 from extending beyond the outboard position thereby providing a stable platform upon movement of the section.

Although not shown, a dust shield may be used to encompass the base support when the seats are in a spaced-apart position. This dust shield may consist of a piece of fabric such as vinyl that is coupled to each of the seat sections to prevent items from contacting the support base when the seat sections are in a spaced-apart position. Alternatively, the support base may be constructed of tubular rails which conceal the extension function and any lubricant associated therewith.

It is noted that the seat section need not rotate but this function is illustrated for use and situations where the opening, is not large enough for an individual to be situated without interference of the automobile door. It is also noted that the movement of the seat sections can be made by use of an electrical drive means such as a DC motor on a rack and pinion type platform so as to allow movement of the seat section in a slow and controlled manner without external assistance, or assistance of the individual who is requesting the move.

Figure 7:
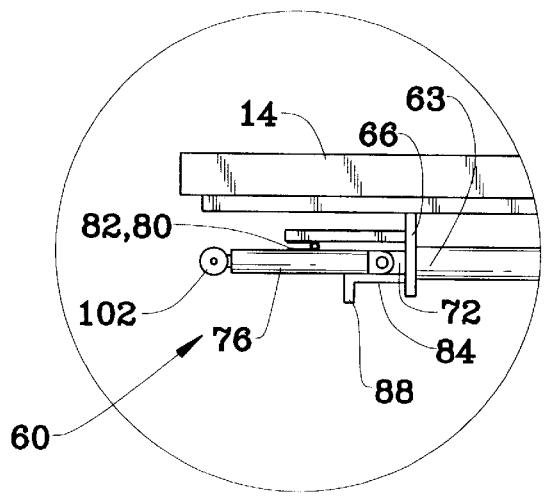
FIG. 7 is a close-up view of the support piston of the present invention shown in a fully-retracted position.

Referring to FIGS. 4 and 7, set forth is a first embodiment of the instant invention. The bracing means 60 of the present invention is shown in its fully-retracted, storage position. The bracing means 60 includes a first translation piston 62 disposed under the first seat section 14; a second translation piston 64 is disposed under the second seat section 16. A linking plate 66,67 extends orthogonally down from each seat section 14,16. The translation pistons 62,64 each include a first end 68,70, fixed within the automobile, and a movable second end 72,74. Support pistons 76,78 are pivotally attached to the translation piston second ends 72,74. Each translation piston 62,64 also includes a seat-positioning sleeve 63,65 that is welded to a corresponding linking plate 66,67. As a result, the linking plates 66,67 and associated seat portions 14,16 slide along the rails 24 as the translation pistons 62,64 extend or retract.

Figure 8:
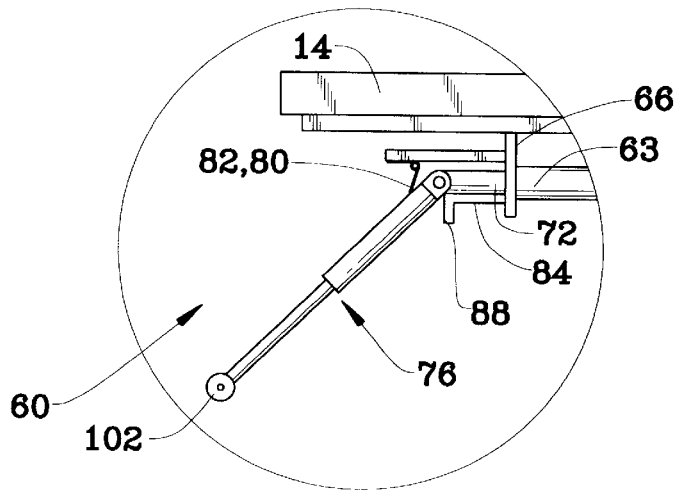
FIG. 8 is a close-up view of the support piston of the present invention shown in a partially-extended position.

Now referring to FIGS. 5 and 8, the translation pistons 62,64 and the support pistons 76,78 are shown in an intermediate, semi-extended orientation. Bias springs 80,82 urge the support pistons 76,78 into a substantially-vertical, bracing orientation. Although the springs 80,82 direct the support pistons 76,78 into a vertical orientation, premature rotation is checked by retention shelves 84,86 mounted on the linking platforms 66,67. As shown in FIG. 6, stop brackets 88,90 prevent the springs 80,82 from forcing the support pistons 76,78 past vertical.

As the translation pistons 62,64 expand towards their fully-extended position, the linking plates 66,67, the seat sections 14,16, and the support pistons 76,78 are all pushed towards the outside of the automobile. As the support pistons 76,78 move outward, each support piston slides across its associated retention shelf 84,86, receiving less and less vertical support therefrom. As the translation pistons 62,64 continue to expand, the biasing springs 80,82 gradually force the support pistons 76,78 into a substantially-vertical, bracing orientation. The stop brackets 88,90 prevent the support pistons 76,78 from pivoting past vertical.

The above-described piston-extension steps will move the seat sections 14,16 from inside an automobile to the outside of the automobile, easing an individual's exit from an automobile in which the seat apparatus 10 is mounted. By reversing the motions, the seat sections 14,16 are similarly guided into the automobile, easing automobile entry.

Figure 9:
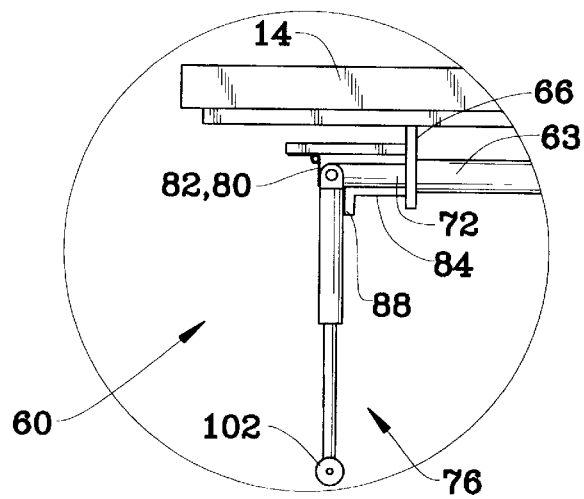
FIG. 9 is a close-up view of the support piston of the present invention shown in a fully-extended, bracing position.

As shown in FIGS. 6 and 9, the support pistons 76,78, are extendable, vertically-biased braces that guard against deflection of the slide rails 24 when the seat sections 14,16 are outside the automobile. The support pistons 76,78 also include wheels or castors 102 that accommodate slight motion of the automobile, allowing the support pistons to remain upright during entry and exit.

Motion of the translation pistons 62,64 and support pistons 76,78 is controlled by a hydraulic pump 92, having translation piston connections 94,96 and support piston connections 98,100. As a result, the translation pistons 62,64 and support pistons 76,78 are completely adjustable from fully-extended to fully retracted position, and any point in-between. The pistons may also be directed by geared control means, as well.

It is to be understood that while I have illustrated and described certain forms of my invention, it is not to be limited to the specific forms or arrangement of parts herein described and shown. It will be apparent to those skilled in the art that various changes may be made without departing from the scope of the invention and the invention is -not to be considered limited to what is shown in the drawings and described in the specification.

What is claimed is:

1. A vehicular seat apparatus for mounting in a vehicle, said seat apparatus comprising:

a plurality of support rails, said support rails having a predefined length;

a first slidable seat section and second slidable seat section that are operatively associated with said support rails, each said seat section being movable from a storage position to an extended position;

bracing means for preventing deflection of said support rails; said bracing means including a plurality of linking plates extending below said seat sections, a plurality of translation pistons disposed under said seat cushions, each of said translation pistons having a first end fixed to said vehicle and a second end attached to a corresponding one of said linking plates, a plurality of support pistons each having a first end pivotally linked to a corresponding one of said linking plates and an opposite second end, a plurality of biasing springs each positioned to direct a corresponding one of said support pistons into a bracing orientation, and control means for adjusting the length of each of said pistons, whereby said seat sections cooperate with said support rails to facilitate ingress and egress from said vehicle and, whereby said seat sections are maintained in a horizontal orientation.

2. The vehicular seat apparatus of claim 1, wherein said seat sections slidably move along said support rails.

3. The vehicular seat apparatus of claim 1, wherein said seat sections rotate with respect to said support rails while supported thereby.

4. The vehicular seat apparatus of claim 1, wherein said seat sections slidably move along said support rails and rotate with respect thereto.

5. The vehicular seat cover apparatus of claim 1, said vehicular seat having foot wells associated with said seat, said seat further including a foldable foot slide which hingeably folds out from said seat and extends over said foot wells of said vehicle.

6. The vehicular seat apparatus of claim 1, wherein each of said support pistons includes a wheel rotatably attached to said second end thereof.

7. The vehicular seat apparatus of claim 1, wherein said control means is a hydraulic pump in communication with said pistons.

8. A vehicular seat apparatus for mounting in a vehicle, said seat apparatus comprising:

a plurality of support rails, said support rails having a predefined length;

a first slidable seat section and second slidable seat section that are operatively associated with said support rails, each said seat section being movable from a storage position to an extended position, each of said seat sections being adapted to rotate with respect to said support rails while supported thereby, whereby said seat sections cooperate with said support rails to facilitate as said seat section moves along said rails between said extended position and said ingress and egress from said vehicle;

a bracing means to prevent deflection of said support rails, whereby said seat sections are maintained in a horizontal orientation;

a plurality of linking plates extending below said seat sections;

a plurality of translation pistons disposed under said seat cushions, each of said translation pistons having a first end fixed to said vehicle, and a second end attached to a corresponding one of said linking plates;

a plurality of support pistons each having a first end pivotally linked to a corresponding one of said linking plates, and an opposite second end;

a plurality of biasing springs each positioned to direct a corresponding one of said support pistons into a bracing orientation; and control means for adjusting the length of each of said pistons.

9. The vehicular seating apparatus of claim 8, wherein each of said support pistons includes a wheel rotatably attached to said second end thereof.

10. The vehicular seating apparatus of claim 8, wherein said control means is a hydraulic pump in communication with said pistons.

* * * * *